United States Patent
Kamayashi

[11] Patent Number: 5,285,395
[45] Date of Patent: Feb. 8, 1994

[54] DISTRIBUTION GENERATION SYSTEM, AND OPTIMIZATION SYSTEM THAT ADOPTS DISTRIBUTION GENERATION SYSTEM

[75] Inventor: Toru Kamayashi, Yokohama, Japan

[73] Assignee: Kabushiki Kaisha Toshiba, Kawasaki, Japan

[21] Appl. No.: 820,502

[22] Filed: Jan. 14, 1992

[30] Foreign Application Priority Data

Jan. 14, 1991 [JP] Japan ................................ 3-014669
Jul. 31, 1991 [JP] Japan ................................ 3-191872

[51] Int. Cl.$^5$ .......................... H02J 3/00; G06F 15/36
[52] U.S. Cl. ...................................... 364/492; 364/554; 364/555
[58] Field of Search ............... 364/492, 553, 554, 555, 364/552, 558, 578; 395/915, 907

[56] References Cited

U.S. PATENT DOCUMENTS

| | | | |
|---|---|---|---|
| 4,472,784 | 9/1984 | Blachman | 364/554 |
| 4,794,528 | 12/1988 | Hirose et al. | 364/900 |
| 4,858,147 | 8/1989 | Conwell | 364/513 |
| 4,872,122 | 10/1989 | Atschuler et al. | 364/554 |
| 4,874,963 | 10/1989 | Alspector | 307/201 |
| 5,051,941 | 9/1991 | Takamine et al. | 364/578 |
| 5,134,685 | 7/1992 | Rosenbluth | 395/21 |
| 5,153,923 | 10/1992 | Matsuba et al. | 395/513 |
| 5,159,660 | 10/1992 | Lu et al. | 395/22 |
| 5,179,527 | 1/1993 | Lawrenz | 364/578 |
| 5,187,673 | 3/1993 | Carver, Jr. et al. | 364/554 |

OTHER PUBLICATIONS

World Scientific Lecture Notes in Physics vol. 9: Spin Glass Theory and Beyond, M. Mezard, et al., Science, vol. 220, No. 4598, May 13, 1983, S. Kirkpatrick, et al., "Optimization by Simulated Annealing".
Patent Abstracts of Japan, vol. 13, No. 219, May 23, 1989, & JP-A-1-33627, Feb. 3, 1989, S. Kaneda, "Parallel Type Processor".
Patent Abstracts of Japan, vol. 12, No. 377, Oct. 7, 1988, & JP-A 63-121978, May 26, 1988, K. Kawamura, et al., "Optimization Processor for Large-Scaled Combination Problem".
Research Disclosure, No. 29924, Mar. 1989, "Method to Achieve Equal Capactiance on a Group of Nets During Circuit Layout and Placement".
A. Corana et al., Minimizing Multimodal Functions of Continuous Variables with the "Simulated Annealing" Algorithm, ACM Transactions on Mathematical Software, vol. 13, No. 3, Sep. 1987, pp. 262-279.
P. J. M. van Laarhoven et al., Some Miscellaneous Topics, Continuous Optimization, Theory and Applications, 1987, pp. 148-153.

*Primary Examiner*—Thomas G. Black
*Assistant Examiner*—Tan Q. Nguyen
*Attorney, Agent, or Firm*—Oblon, Spivak, McClelland, Maier & Neustadt

[57] ABSTRACT

The principal characteristic feature of this invention is to obtain a distribution generation system, that can realize arbitrary appearance probabilities for a plurality of conditions. The distribution generation system of this invention is constituted by a plurality of units each having a condition storage section for storing a corollary condition, and a condition transition section for updating the condition of the condition storage section. In each unit, stochastic processes per unit time for causing the condition of the condition storage section to transit to a predetermined condition are caused to approximately continue by the condition transition section, so that the corollary condition is converged to random variables having a given distribution.

15 Claims, 12 Drawing Sheets

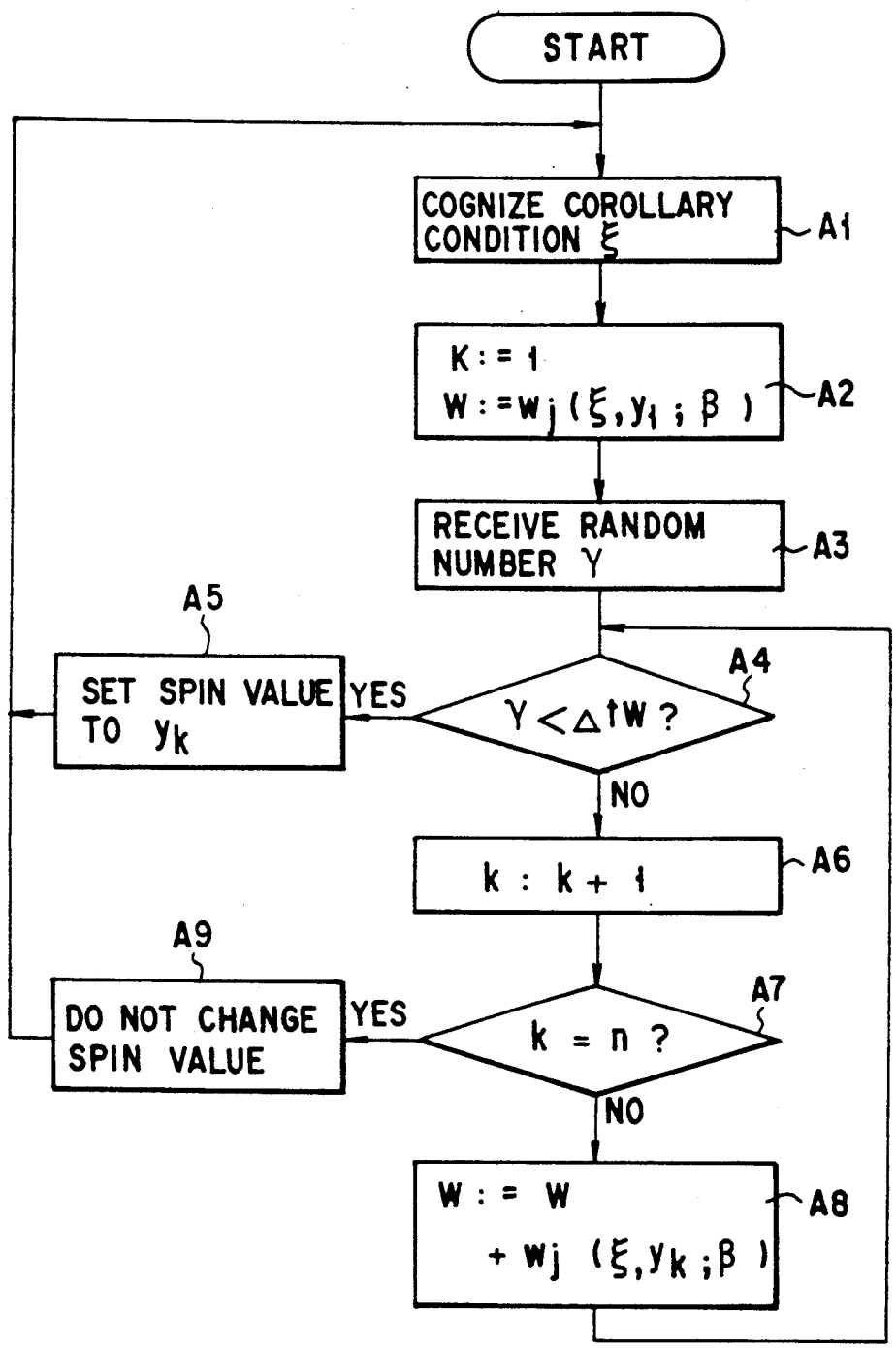
F I G. 6

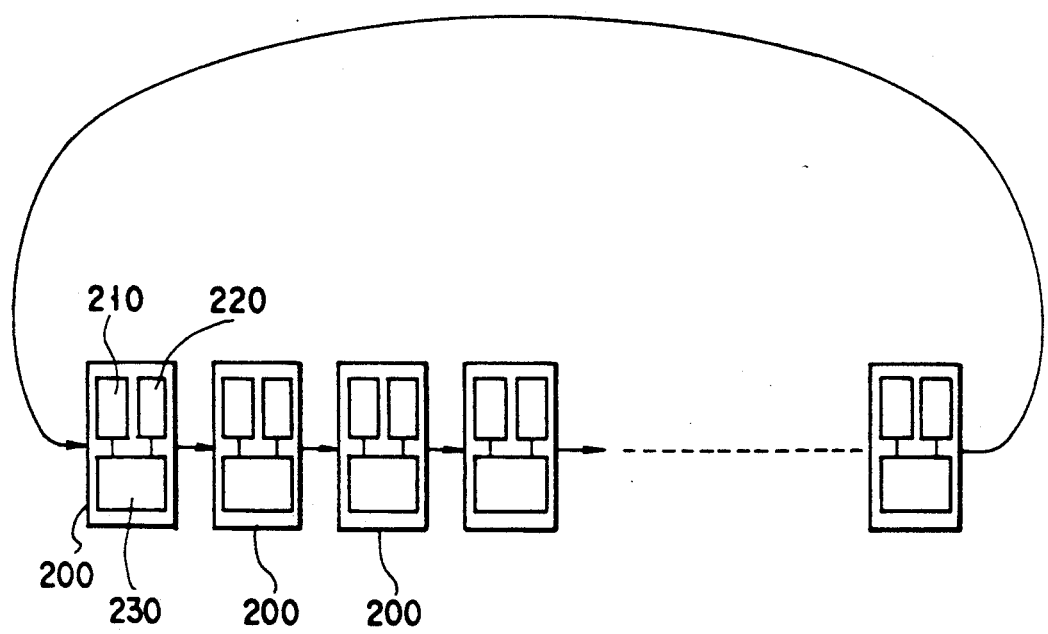
F I G. 8

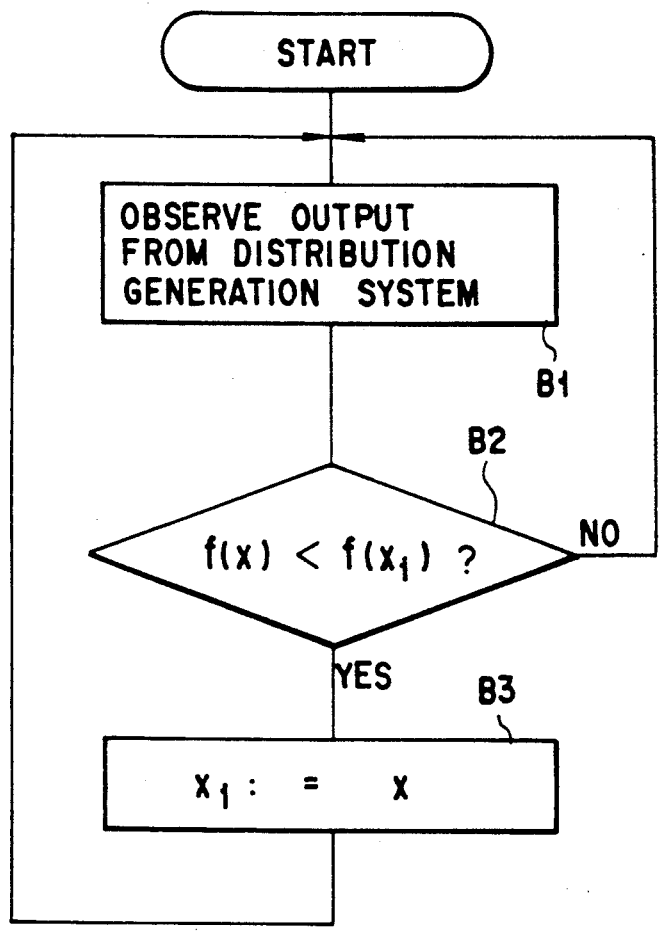
F I G. 11

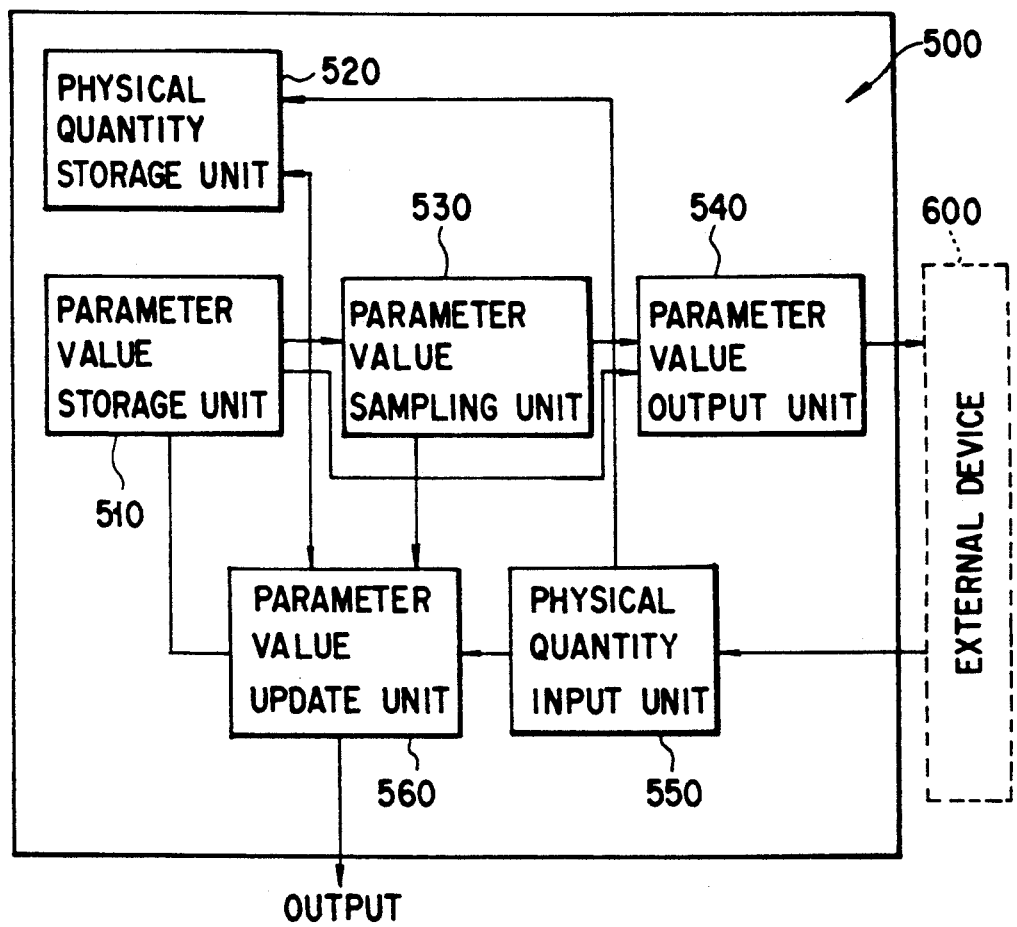
F I G. 13

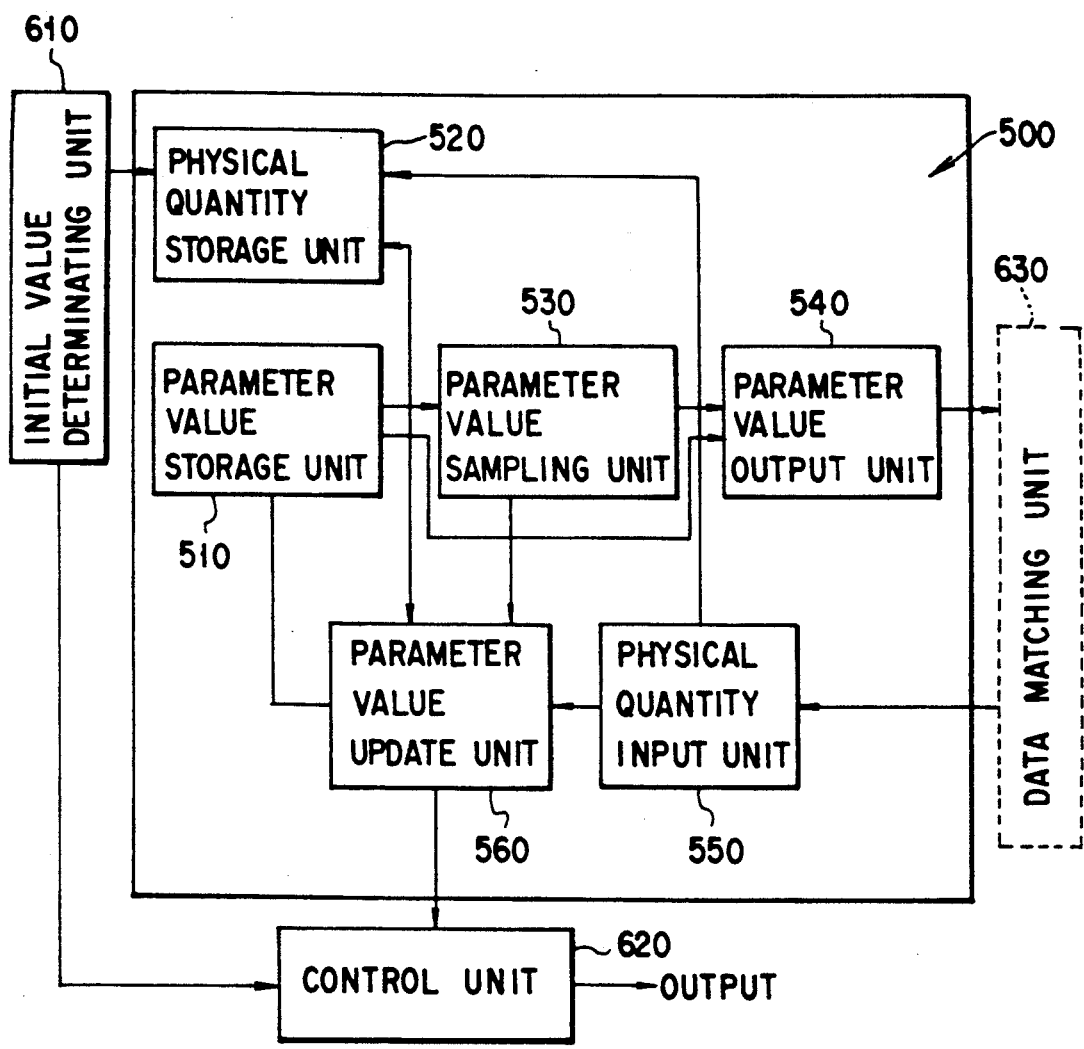
F I G. 14

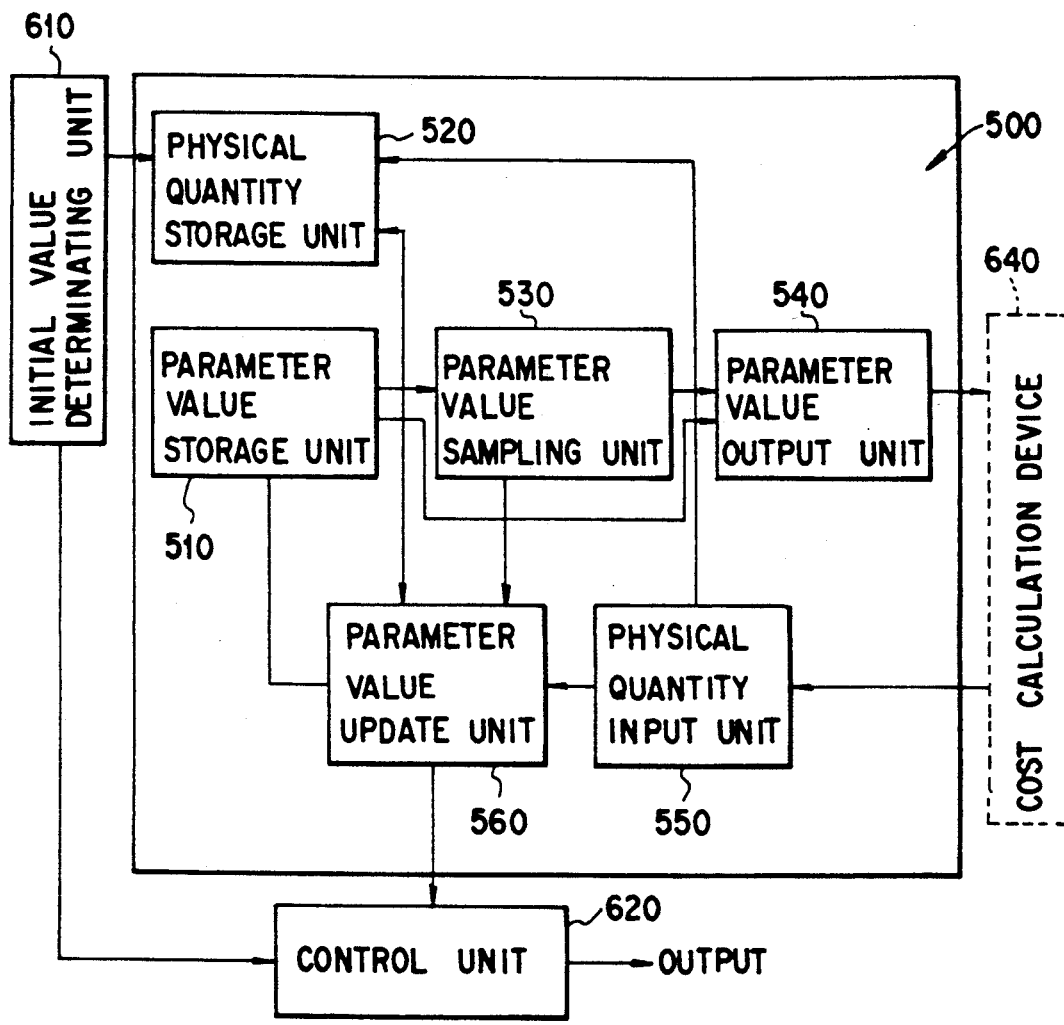
F I G. 15

DISTRIBUTION GENERATION SYSTEM, AND OPTIMIZATION SYSTEM THAT ADOPTS DISTRIBUTION GENERATION SYSTEM

BACKGROUND OF THE INVENTION

1. Field of the Invention

The present invention relates to a distribution generation system for generating a stochastic measure on a finite set. Furthermore, the present invention relates to an optimization system, which applies the distribution generation system to search an optimized value of a physical quantity determined by one or a plurality of parameters.

2. Description of the Related Art

Application of a system for searching a minimum value of a function having discrete or continuous domains in a domain of definition to various fields has been examined. For this purpose, extensive studies and developments have been made.

As the above-mentioned system, an optimization system for searching an optimized value of a physical quantity determined by one or a plurality of parameters is known.

For example, the optimization system is utilized in a field to be described below.

(a) Core Design of Power Generation Nuclear Reactor

Assume that the core has a cylindrical shape having a radius of r m and a height of h m, and the degree of enrichment of a fuel stored in the core is represented by uk g/m$^3$. In order to continue an operation, the following critical condition must be established:

$$\frac{ku}{\left(\frac{\alpha}{r}\right)^2 + \left(\frac{\pi}{h}\right)^2} \geq 1$$

where $\alpha$ and k are constants.

On the other hand, cost necessary for constructing the above-mentioned core is approximately given by:
where $a_1$, $a_2$, and $a_3$ are constants.

$$c(r,h,u) = a_1 r^2 hu + a_2 \sqrt{v} - a_3 r \sqrt{h}$$

In order to optimally design the core according to the above-mentioned conditions, the following optimization problem must be solved.

$$\text{Minimization: } c(r,h,u) \, a_1 r^2 hu + a_2 \sqrt{u} + a_2 \sqrt{u} - a_3 r \sqrt{h}$$

$$\text{Condition: } \frac{1}{ku}\left(\frac{a2}{r^2} + \frac{\pi 2}{h^2}\right) \leq 1$$

$$0 \leq r \leq r_m, \, 0 \leq h \leq h_m, \, 0 \leq u \leq u_m$$

where $r_m$, $h_m$, and $u_m$ are constants.

(b) LSI Layout

In order to efficiently utilize a wafer by increasing the degree of integration of LSIs, each LSI must be laid out to minimize the circuit area. As one solution to the problem, the following method is known.

The antecedent conditions for this layout are set as follows:

(1) An area S where a circuit is assumed to be laid out is given in advance.

(2) A circuit is considered as a graph having connecting lines among units.

(3) Each unit is assumed to have a predetermined area.

(4) Units are classified into two groups, and are laid out to minimize the number of connecting lines extending between the two groups.

(5) The total sum of the areas of units in each group is set not to exceed an area where the units in the group are to be laid out, i.e., S/2 in this case.

The above-mentioned conditions are applied to the two equally divided groups, thereby obtaining a schematic LSI layout.

In this method, the schematic layout is obtained by solving the following optimization problem when the units are equally divided into the two groups for the first time. The total number of units is represented by n, and the units are numbered from 1 to n. The number of connecting lines between units j and k is represented by $c_{jk}$ (for $c_{jk}=c_{kj}$) An area occupied by the unit j is represented by oj.

$$\begin{cases} \text{Minimization: } \frac{1}{2} \sum_{j,k=1}^{n} c_{jk}(x_j - x_k)^2 \\ \text{Condition: } \sum_{j=1}^{n} \sigma_j x_j \leq \frac{S}{2} \\ \text{for } x_j \, 0 \text{ or } 1 \end{cases}$$

$$\text{For } \sum_{j=1}^{n} \sigma_j \leq S$$

(c) Box Girder Design

In the box girder design, the sectional shape of a box girder, which receives a uniform axial pressure, is designed when the magnitude of an axial compression force and the length of the girder are given.

In this case, conditions are as follows.

(1) A load is only an axial compression force, and the girder is supported at two ends.

(2) The girder is designed under a condition disregarding elastic buckling and plastic buckling for overall buckling of the girder as a column, and local buckling of plates constituting the girder.

(3) The optimal sectional shape is one corresponding to the minimum girder weight. That is, the sectional shape having a minimum volume is obtained under an assumption that a uniform material is used.

(4) The box girder is assumed to have a square section, and parameters representing the sectional shape are represented by a plate thickness t and a plate width a.

The box girder can be optimally designed by finding out parameters that satisfy the following conditions of the parameters t and a for minimizing a volume V=AL under the above-mentioned assumptions:

Conditions $n\sigma \leq \sigma_c^*$ and $n\sigma \leq \sigma p^*$

In this case, when A=4at. I=(2/3)a$^3$t, and $\sigma$=P/A. we have:

$$\sigma_c^* = \begin{cases} E\pi \frac{I}{AL^2} & \left(\text{if } E\pi^2 \frac{I}{AL^2} \leq \frac{\sigma_y}{2}\right) \\ \sigma_y - \frac{1}{4} \cdot \frac{\sigma_y^2}{E\pi^2 \frac{I}{AL^2}} & \left(\text{if } E\pi^2 \frac{I}{AL^2} > \frac{\sigma_y}{1}\right) \end{cases}$$

and $$\frac{E\pi^2}{3(1-v^2)} \left(\frac{t}{a}\right)^2$$

$$\left(\text{if} \frac{E\pi^2}{3(1-v^2)} \left(\frac{t}{a}\right)^2 \leq \frac{\sigma_y}{2}\right)$$

$$\sigma_y - \frac{1}{4} \cdot \frac{\sigma_y^2}{\frac{E\pi^2}{3(1-v2)} \left(\frac{t}{2}\right)^2}$$

$$\left(\text{if} \frac{E\pi^2}{3(1-v^2)} \left(\frac{t}{a}\right)^2 > \frac{\sigma_y}{2}\right)$$

where P is the axial compression force, L is the length of the girder, E is the Young's modulus, ν is the Poisson ratio, σy is the yield point, and n is the safety factor for buckling.

The above-described optimization system is utilized in combination with a physical quantity computer. For example, in the case (c), the optimization system supplies the values of the parameters t and a to the physical quantity computer. The physical quantity computer calculates the volume V on the basis of the values of the parameters t and a, and sends back the volume V to the optimization system. The optimization system changes the values of the parameters t and a on the basis of the volume V, and sends the parameters to the physical quantity computer again. After the abovementioned process is repeated a finite number of times, the optimization system outputs a plate thickness t and a plate width a, which can minimize the volume V.

There are many problems of minimizing (or maximizing) a target function under given limitation conditions over various industrial fields in addition to the abovementioned cases. As a means for solving these problems, an optimization searching technique is widely utilized.

An optimization system of this type is executed by classifying given problems according to the natures of minimized functions (to be referred to as target functions) or restriction conditions, and selecting different operations. For example, (1) When a smooth nonlinear function defined by a continuous domain is solved without any restriction conditions, the system is operated in the steepest descent method.

(2) When a quadratic function having discrete domains of definition is optimized, the simulated annealing method is often used.

In addition to the above methods, the random method may be used.

The steepest descent method is a method of searching an optimized solution by repeating a small movement in a direction to minimize a function value from one point on the domain of definition as a start point. The direction to minimize a function value is determined by partially differentiating a function. More specifically, a movement is performed in a direction opposite to the gradient of the function (i.e., the sign inverting direction of a vector). FIG. 1 shows a state wherein the optimized solution is searched by repeating a small movement in a direction to decrease a function value.

The simulated annealing method is a kind of the Monte Carlo method. Assume that there are a corollary S consisting of N units each assuming two values (e.g., ±1), and a quadratic function V defined as follows for possible conditions s of the corollary S.

$$S = \prod_{k=1}^{N} \{-1, +1\}, S \; s \{1,2,\ldots,N\} \to \{-1, 1\}$$

$$V(s) = \sum_{\mu,\nu} T_{\mu\nu} s(\mu) s(\nu)$$

In this case, the object is to obtain a condition for minimizing V. For this purpose, the following procedure is executed. Assuming that the corollary is in a condition $s_1$, one of spins is selected, and a condition wherein the sign of the selected spin is inverted is represented by $s_2$. A value $V(s_2) - V(s_1)$ is calculated. If the calculation result is negative, the sign of the spin is inverted, and the corollary is set in the condition $s_2$. Otherwise, the sign of the spin is inverted at a probability of $\exp(-\beta(V(s_1) - V(s_2)))$ (where $\beta$ is a positive constant).

A probabilistic transition is repeated by changing a spin to be selected, as described above. In this case, all the spins are uniformly selected. As the probabilistic transition is repeated, the value $\beta$ is gradually increased. At this time, the rate of increase in $\beta$ must be very slow (normally, the order of the logarithm is eliminated). As a result, after an elapse of a predetermined period of time, the corollary can obtain a condition for minimizing V.

The random method is a method of searching a point for minimizing a function value by repeating an operation for uniformly selecting a point on the domain of definition, and determining a function value at the selected point.

According to the conventional optimization system, an application range is limited depending on the natures of target functions and restriction conditions, resulting in poor versatility. Even when a target function defined by a continuous domain is to be optimized, a global minimum value cannot always be searched (obtained). In fact, an optimized solution can be obtained by, e.g., the steepest descent method only when a function does not have a plurality of minimal values in a domain to be searched. Although an operation according to the random method can search a global minimum value, its searching efficiency is very poor. The simulated annealing method can search a global minimum value, and can improve searching efficiency as compared to the random method. However, since parallel processing that can be executed in the random method cannot be executed in this method, searching efficiency is also poor. This method is effective for only a target function having discrete domains of definition.

The distribution generation system is used for the following purpose.

In order to simulate or test a computer system, jobs must be generated according to a specific distribution (probability distribution) such as a normal distribution, Poisson distribution, and the like. The distribution generation system is used for generating events according to the probability distribution. The distribution generation system is utilized not only in a computer system but also in a system for generating a dummy accident so as to verify the reliability of a technologically designed system. Random numbers are often used upon constitution of a system. The random number generation system is also a distribution generation system for uniformly generating probability events according to a distribution.

When random variables having a specific distribution on a bounded period are constituted, the conventional distribution generation system employs a method of modifying a uniform distribution obtained by uniformly random numbers by a function. For example, when f is a function for transferring a period [0, 1] to the period [0, 1], f(r) represents random variables according to a specific distribution on [0, 1] with respect to random numbers r uniformly distributed on the period [0, 1]. The function f can be properly determined according to a required distribution form. This method is used upon constitution of random variables taking a finite number of values, and complying with an arbitrarily given distribution. For example, in order to constitute random variables respectively taking values 1, 2, and 3 at probabilities of $\frac{1}{2}$, $\frac{1}{4}$, and $\frac{1}{4}$, the following function can be adopted as the abovementioned f.

$$f(x) = \begin{cases} 1 \text{ if } 0 \leq x \leq 1/2 \\ 2 \text{ if } 1/2 \leq x \leq 3/4 \\ 3 \text{ if } 3/4 \leq x \leq 1 \end{cases}$$

According to the conventional distribution generation system, it is generally difficult to constitute random variables, which assume values in a multidimensional space, and comply with an arbitrarily given distribution. When random variables taking a finite number of values are to be constituted, it is practically impossible to obtain a function used in modification of random numbers when the number of values is huge.

The associated techniques of the present invention are disclosed in A. Corona et al.,; "Minimizing Multimodel Functions of Continuous Variables with the 'Simulated Annealing' algorithm", ACM Trans. Math. Software, Vol. 13, No. 3, Sep. 1987, pp. 262-280, and "Simulated Annealing; Theory and Applications", P. J. M. Laarhoven and E. H. L. Aarts; Reidel, 1987, pp. 148-152.

SUMMARY OF THE INVENTION

It is an object of the present invention to provide a distribution generation system, which can obtain random variables according to an arbitrary distribution at a high speed.

It is another object of the present invention to provide an optimization system, which can be applied even when a target function has either a discrete or continuous domain of definition, has a global characteristic, and can be realized by a parallel computer.

It is still another object of the present invention to provide an optimization system having high efficiency and a global characteristic.

The distribution generation system of the present invention is characterized by comprising a plurality of units each of which includes a condition storage device for storing a corollary condition, and a condition transition device for updating the condition of the condition storage device, wherein in each of the plurality of units, the condition transition device causes a plurality of stochastic processes per unit time for causing the condition of the condition storage device to transit to a predetermined condition to approximately continue, so that the corollary condition is converged to random variables having a predetermined distribution.

According to the distribution generation system of the present invention, random variables according to an arbitrary distribution can be quickly obtained, and an arbitrary appearance probability can be realized for a plurality of conditions. In particular, when a given point is represented by x, the system can generate random variables, which are distributed densely at positions near the point x, and sparsely at positions far from the point x, thereby obtaining a probability distribution, which can be very efficiently applied to the optimization system of the present invention.

The optimization system of the present invention is characterized by comprising a random variable output device for time-serially outputting random variable values having a predetermined distribution; and a candidate of optimized solution update device for holding a candidate of an optimized solution, the candidate of optimized solution update device including device for performing optimized solution searching while updating the candidate of the optimized solution on the basis of the random variable values output from the random variable output device.

When the distribution generation system that can realize an arbitrary appearance probability for a plurality of conditions is applied to the optimization system of the present invention, the optimization system can be applied even when a target function has either a discrete or continuous domain of definition. Furthermore, this system has high versatility, that is, has a global characteristic, and can be realized by a parallel computer, thereby realizing very efficient optimized solution searching.

Another optimization system of the present invention is characterized by comprising a parameter value storage device for storing a parameter value, a physical quantity storage device for storing a physical quantity corresponding to the parameter value stored in the parameter value storage device; a parameter value sampling device for executing concentrated sampling for densely sampling values near the parameter value stored in the parameter value storage device, and sparsely sampling values far from the parameter value, and for outputting sample parameter values; physical quantity fetching device for outputting the sample parameter values generated by the parameter value sampling device to an external device, and fetching physical quantities corresponding to the sample parameter values from the external device; and a parameter value update device for updating the parameter value stored in the parameter value storage device according to a comparison result between the physical quantities corresponding to the sample parameter values fetched by the physical quantity fetching device, and the parameter value stored in the parameter value storage device.

The other optimization system of the present invention densely samples points near a parameter value, and sparsely samples points far from the parameter value, thereby sampling far points. Therefore, according to this system, physical quantity searching having a global characteristic and high searching efficiency can be attained. Furthermore, this system samples near points very densely, and repeats a probabilistic transition, thereby obtaining an optimal parameter value of a physical quantity with high precision.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 6 is a flow chart for explaining the first embodiment of the distribution generation system of the present invention;

FIG. 8 is a diagram showing the third embodiment of a distribution generation system of the present invention;

FIG. 11 is a flow chart for explaining the optimization system of the present invention shown in FIG. 10;

FIG. 13 is a schematic diagram showing the second embodiment of the optimization system of the present invention;

FIG. 14 is a schematic diagram for explaining the first detailed arrangement according to the second embodiment of the optimization system of the present invention; and FIG. 15 is a schematic diagram for explaining the second detailed arrangement according to the second embodiment of the optimization system of the present invention.

DETAILED DESCRIPTION OF THE PREFERRED EMBODIMENTS

Figure 1:
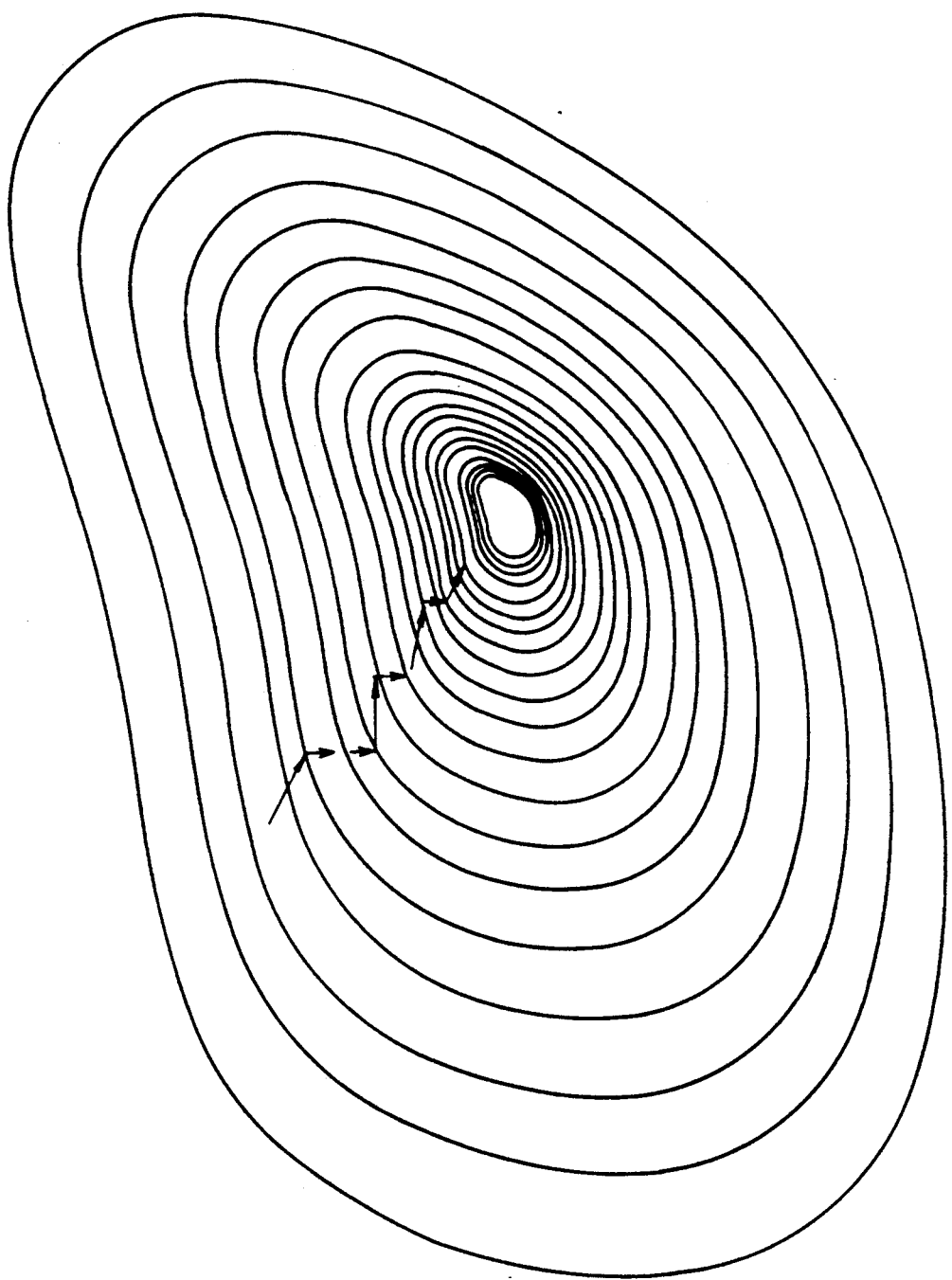
FIG. 1 is a view for explaining an example of a conventional optimization system.

The preferred embodiments of the present invention will be described hereinafter with reference to the accompanying drawings.

A distribution generation system applied to an optimization system of the present invention will be briefly described below.

The distribution generation system is constituted by combining a plurality of units each having a condition storage section for storing a corollary condition, a transition section for updating the condition, and a memory section. The corollary condition is updated according to the condition storage section and the Glauber-Kirkpatrick-Kambayashi rule (to be referred to as the GKK rule hereinafter). Each unit is called a spin. A condition of a spin means a condition held in the condition storage section constituting the spin. For the sake of simplicity, the spins are assumed to have the same number of conditions, and the conditions are labeled with $0, 1, 2, \ldots, n-1$.

The distribution generation system is constituted by a spin corollary including N spins each taking n conditions. The spins are numbered from 0 to $N-1$, and a spin (unit) having number j will be referred to as $U_j$ or a spin j hereinafter. A condition of the spin corollary means alignment of the conditions of the spins. For example the condition of the spin corollary is expressed as:

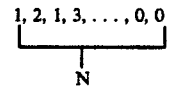

If the overall possible condition of the corollary is represented by $\Xi$ $\Xi$ is given by:

$$\Xi = \{0, 1, \ldots, n-1\}^N$$
$$= \{\xi: \{0, 1, \ldots, N-1\} \rightarrow \{0, 1, \ldots, n-1\}\}$$

The value of the spin j when the corollary is in $\xi$ is expressed as $\xi(j)$.

According to the distribution generation system of the present invention, a time-serially continuous Markov process on a condition space of a spin corollary can be simulated by introducing a short time to the transition rules of each spin to form approximately continuous stochastic processes. According to this method, the transitions of the spins can be made parallel to each other, and the corollary condition is converged to random variables having a distribution at a high speed.

The distribution generation will be described in more detail below. The rule of the operations of the spins to be described below is called the GKK rule.

Assume that a real number value function V on a condition space $\Xi$ of the spin corollary is given. V is called a potential function on the spin. The corollary condition is assumed to satisfy:

$$\xi \in \Xi$$

A(x) represents:

Set $\{0, 1, \ldots, n-1\} - \{x\}$ ($x \in \{0, 1, \ldots, n-1\}$)

A probability per unit time that the value of the jth spin (spin j) transits from $\xi(j)$ to y (y$\in$A($\xi(j)$)) is represented by $w_j(\xi,y;\beta)$. $w_j(\xi,y;\beta)$ is determined, so that the following equation is established for all the conditions.

$$-\sum_{j=0}^{N-1} \sum_{y\in A(\xi(j))} (u_\beta \circ V)(\xi) w_j(\xi,y,\beta) +$$

$$\sum_{j=0}^{N-1} \sum_{y\in A(\xi(j))} (u_\beta \circ V)(\tau_{j,y}\xi) w_j(\tau_{j,y},\xi,\xi(j);\beta) = 0$$

where $u\beta$ is the monotone decreasing function from a physical body having $\beta$ as a parameter to another physical body, and o represents the synthesis of functions. $\tau_{j,y}\xi$ is the element of $\xi$, and is determined as follows:

$$(\tau_{j,y}\xi)(k) = \begin{cases} y & (\text{when } k = j) \\ \xi(k) & (\text{when } k \neq j) \end{cases}$$

For example, when $u_\beta(x) = \exp(-\beta x)$, we have:

$$w_j(\xi,y,\beta) = \text{Exp}\cdot\{\beta(V(\tau_j k\xi) - V(\xi))^-\} \quad (1)$$

or $$w_j(\xi,y;\beta) = \{1 + \exp\{\beta(V(\tau_j k\xi) - V(\xi))\}\}^{-1}$$

The following relation is established for a real number x.

$$x^- = \begin{cases} x & \text{if } x < 0 \\ 0 & \text{if } x \geq 0 \end{cases}$$

When a small constant $\Delta t$ is given for each spin, a probability $p(\xi,y;\beta)$ that the spin j changes its spin value from $\xi(j)$ to y in a single transition is calculated by the following equation:

$$p(\xi,y;\beta) = \begin{cases} \Delta t w_j(\xi,y;\beta) & \text{if } y \in A(\xi(j)) \\ 1 - \sum_{x\in A(\xi(j))} p(\xi,x;\beta) & \text{if } y = \xi(j) \end{cases}$$

The above-mentioned probabilistic transition can be realized by the normal Monte Carlo method for determining a transition destination upon comparison with a random number. In this case, transitions of the spins occur at the same time, and the above-mentioned transition of the spin corollary is repeatedly performed. From this condition, when the corollary condition is considered in terms of random variables, its law of probability immediately and asymptotically approaches a distribution proportional to $u_\beta \circ V$. Because, when a probability taking a condition $\xi$ at time t is represented by $p_t(\xi)$, the corollary condition that repeats the above-mentioned probabilistic transition is approximated by the following stochastic equation:

$$\frac{\partial p}{\partial t} t(\xi) = -\sum_{j=1}^{n} \sum_{y\in A(\xi(j))} p_t(\xi) w_j(\xi,y;\beta) +$$

$$\sum_{j=1}^{n} \sum_{y\in A(\xi(j))} p_t(\tau_{j,y}\xi) w_j(\tau_{j,y}\xi,\xi(j);\beta)$$

In the above-mentioned probability dynamic, a probability proportional to $u_\beta \circ V$ becomes exponentially stable.

The optimization system to which the distribution generation system described above is applied will be described below using examples.

As a simple example, the following problem will be examined.

"Minimize $f(x) = x\sin(16\pi x)$ for $0 \leq x \leq 1$."

Assuming N is a sufficiently large natural number, and:

$$x_j \, j/2^N, X = \{x_j | j = 0, 1, \ldots, 2^{N-1}\}$$

random variables $\chi$ that assume values on X, and whose probability distribution is proportional to the following relation can be obtained:

$$\exp(-\beta f(x)) \quad (x \in x)$$

Based on this probability distribution, a global optimized solution (or a solution approximate thereto) of $f(x)$ can be obtained. $\beta$ is a positive constant.

Figure 2:
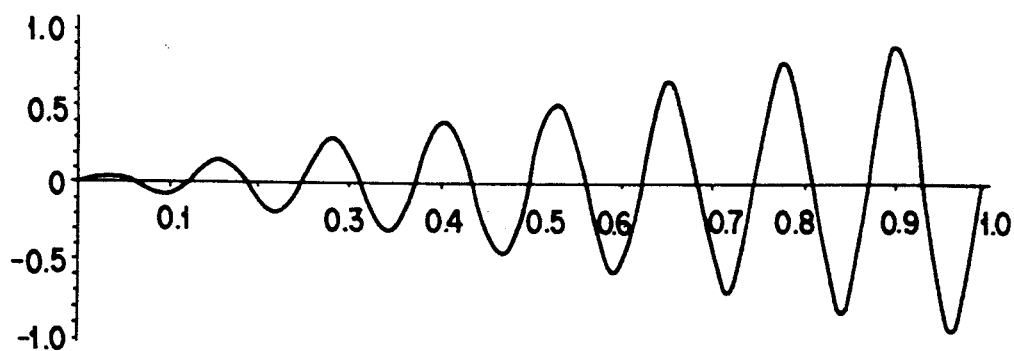
FIG. 2 is a graph of $f(x) = x \sin(16cx)$ ($0 \leq x \leq 1$) for explaining an optimization system of the present invention.
Figure 3:
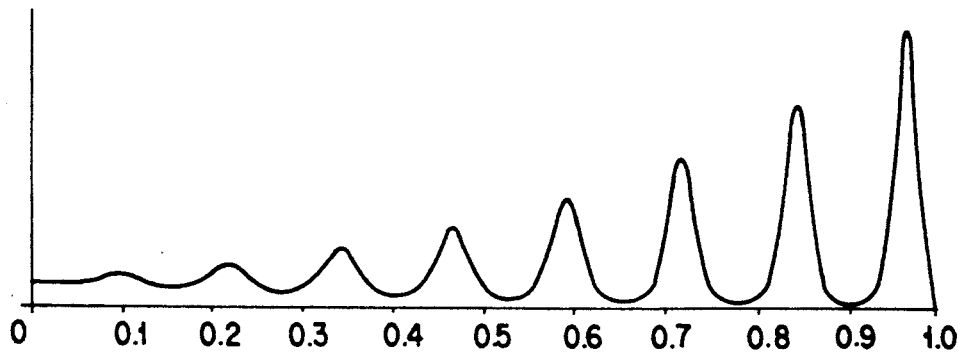
FIG. 3 is a graph showing a stochastic measure proportional to $\exp(-\beta f(x))$ when $0 \leq x \leq 1$ so as to explain the optimization system of the present invention.
Figure 4:
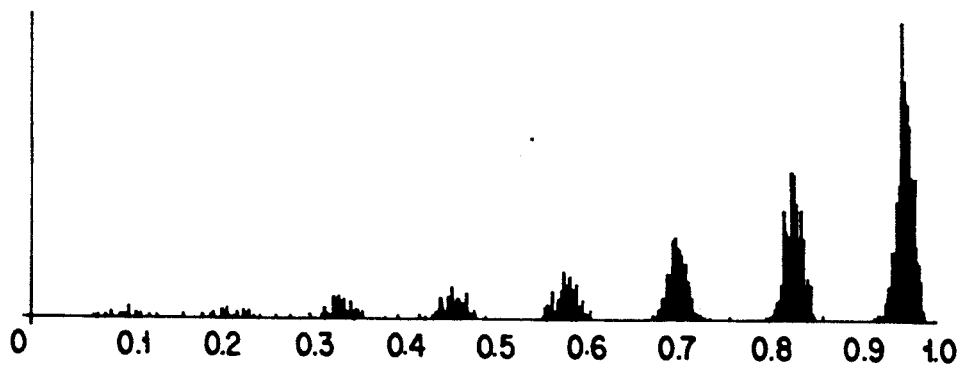
FIG. 4 is a graph showing a distribution generated by a distribution generation system applied to the optimization system of the present invention.

FIG. 2 is a graph of $f(x) = x\sin(16cx)$ ($0 \leq x \leq 1$). FIG. 3 shows a stochastic measure proportional to $\exp(-\beta f(x)$ for $0 \leq x \leq 1$. FIG. 4 is a graph of the distribution of $\chi$ generated by the above-mentioned method.

When a large number of values of random variables $\chi$ are observed by the above-mentioned method, values near an optimized solution of $f(x)$ can be detected, and for example, the descent method can be applied using these values as an initial condition. Alternatively, a period may be shortened, and random variables may be constituted again. Upon repetition of these operations, an optimized solution can be ultimately obtained.

The detailed arrangement based on the abovementioned concept will be explained below.

Figure 5:
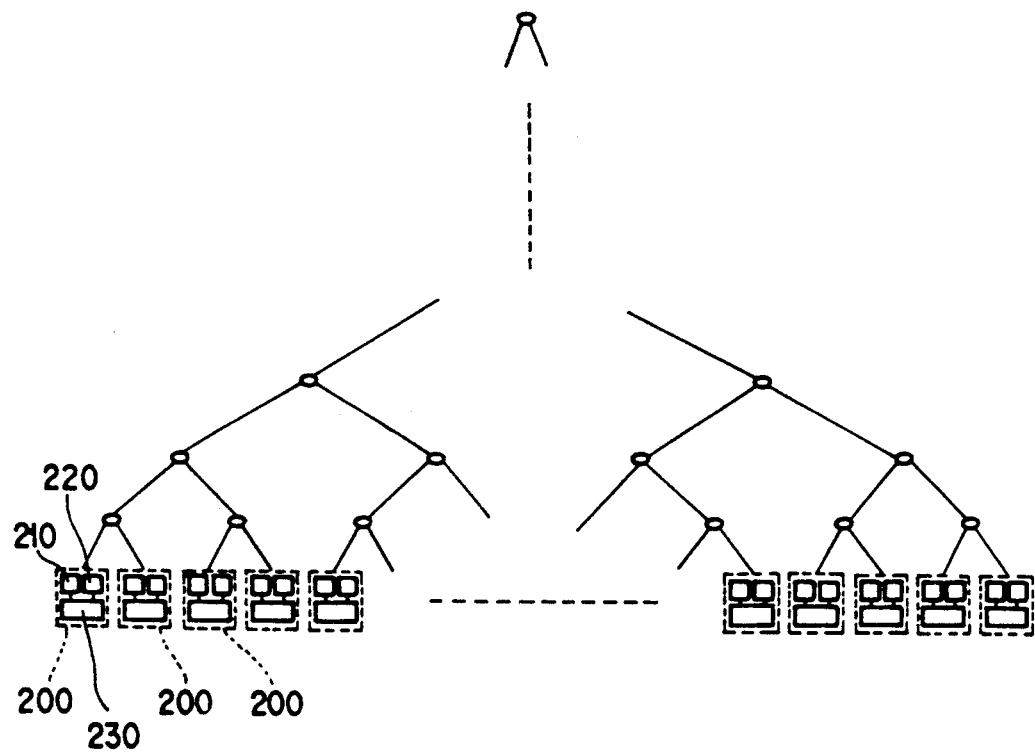
FIG. 5 is a diagram showing the first embodiment of a distribution generation system of the present invention.

FIG. 5 is a diagram showing the first embodiment of a distribution generation system according to the present invention. This system is constituted by $2^q$ units (spins) 200 each having a condition storage means 210, a condition transition means 220, and a memory means 230. The units 200 are connected to constitute a binary x tree.

In the distribution generation system of this embodiment, a series of data transfer operations and condition transition operations in the units are determined as one cycle, and this cycle is repeated. In this embodiment, a case will be explained below wherein the random variables $\chi$ in the above example are generated. Note that $N = 2^q$.

When the overall condition of the spin corollary is represented by $\Xi$ a function V on $\Xi$ can be defined by $V(\xi) = f(b(\xi))$ using $b : \Xi \to X$ as mapping for causing a binary small number $0\xi(0)\xi(1)\ldots\xi(N-1)$ to correspond to a condition $\xi$. The variables $\chi$ assume values on $\Xi$, and are equivalent to variables $(\sim \xi)$ according to the following probability distribution.

$$P((\sim\xi) = \xi) = 1_\mu \cdot \exp(-\beta v(\xi))$$

where $P((\sim\xi) = \xi)$ is the probability of yielding $(\sim\xi) = \xi$, which is given by:

$$Z_\beta = \sum_\eta \exp(-\beta V(\xi))$$

The calculation procedure of the function V and a small constant Δt are given to each spin 200. The calculation procedure and the constant are stored in the memory means 230 of each spin 200.

The corollary of the spins 200 is divided into groups $G_0, G_1, \ldots, G_{q-1}$ as follows.

$$G_m = \{U_j | j \bmod 2^m = 0, \bmod 2^{m+1} \neq 0\}$$
$$(0 \leq m \leq p-1)$$

where mod represents the remainder ($0 \leq a \bmod b < b$).

One cycle of operations of the system will be described below. First, the conditions of the corollary are collected in the spin 0. m=0 is set, and a spin $U_j$ belonging to $G_m$ transmits its spin value to a spin 200 expressed by:

$$U_j - (j \bmod 2^{m+1})$$

The reception-side spin 200 holds the received spin value in the memory means 230. Then, m is incremented by one, and the same communication is performed. In the communication, if spin values previously sent from other spins 200 are stored in the memory means 230, each spin 200 transmits these values together with the value of the corresponding spin 200. When m=q−1, the spin $U_0$ can hold all the spin values, i.e., the condition of the spin corollary.

The corollary condition held by the spin 0 is transmitted to all the spins 200. This transmission operation is called a broadcast operation. In the broadcast operation, communications among the spins 200 can be performed in a procedure opposite to a case wherein the corollary condition is collected. Each spin 200, which received the corollary condition, holds the condition in its memory means 230, and performs transmission according to the broadcast procedure. Each spin 200 performs a condition transition according to the GKK rule. The condition transition means 220 calculates a probabilistic transition on the basis of the corollary condition held in the memory means, the calculation procedure of V, and the constant Δt, and updates the condition according to the probabilistic transition.

FIG. 6 shows the flow of the operations of the condition transition means 220 of the spin j.

The corollary condition is assumed to be $\xi$. Furthermore, assume that $A(\xi(j)) = \{y_1, y_2, \ldots, y_{n-1}\}$.

After the corollary condition $\xi$ is cognized (step A1), k=1 and $W = w_1(\xi, y_k; \beta)$ are set (step A2). When a random number r (for r∈[0,1]) is received (step A3), r and ΔtW are compared with each other (step A4). If it is determined in step A4 that r<ΔtW, a spin value is changed to $y_k$, thus completing a single transition operation (step A5). Otherwise, k is incremented by one (step A6).

If it is determined in step A7 that k=n, a single transition operation is ended without changing the spin value (step A9). If it is determined in step A7 that k≠n, the value W is increased by $w_j(\xi, y_k; \xi)$ (step A8), and the operations in step A4 and the subsequent steps are repeated. As a calculation formula for $w_j(\xi, y_k; \beta)$, equation (1) is used. In this processing, since it is considered that a probability that the spin value is changed in a single transition operation is small, when values of $w_j(\xi, y_k; \beta)$ calculated in steps A2 and A8 are held, these values can be possibly used in the next transition, thus improving calculation efficiency.

A spin 200 belonging to $G_m$ (m≠0) is set in a reception waiting state after the condition transition, and upon completion of the condition transition of a spin 200 belonging to $G_0$, one cycle of the operations of the system is completed. The spin 200 belonging to $G_0$ performs operations of the next cycle, i.e., transits the spin value immediately after the condition transition. When the above-mentioned cycle is repeated, the condition $\xi$ of the spin corollary appears at a probability of $1/Z_\beta \cdot \exp(-\beta V(\xi))$. More specifically, random variables according to the give probability distribution can be constituted.

In the above description, the distribution generation system consisting of $2^q$ spins has been exemplified. However, when the binary three in the above description is changed to a P-adic tree, a distribution generation system consisting of $p^q$ spins can be constituted.

Figure 7:
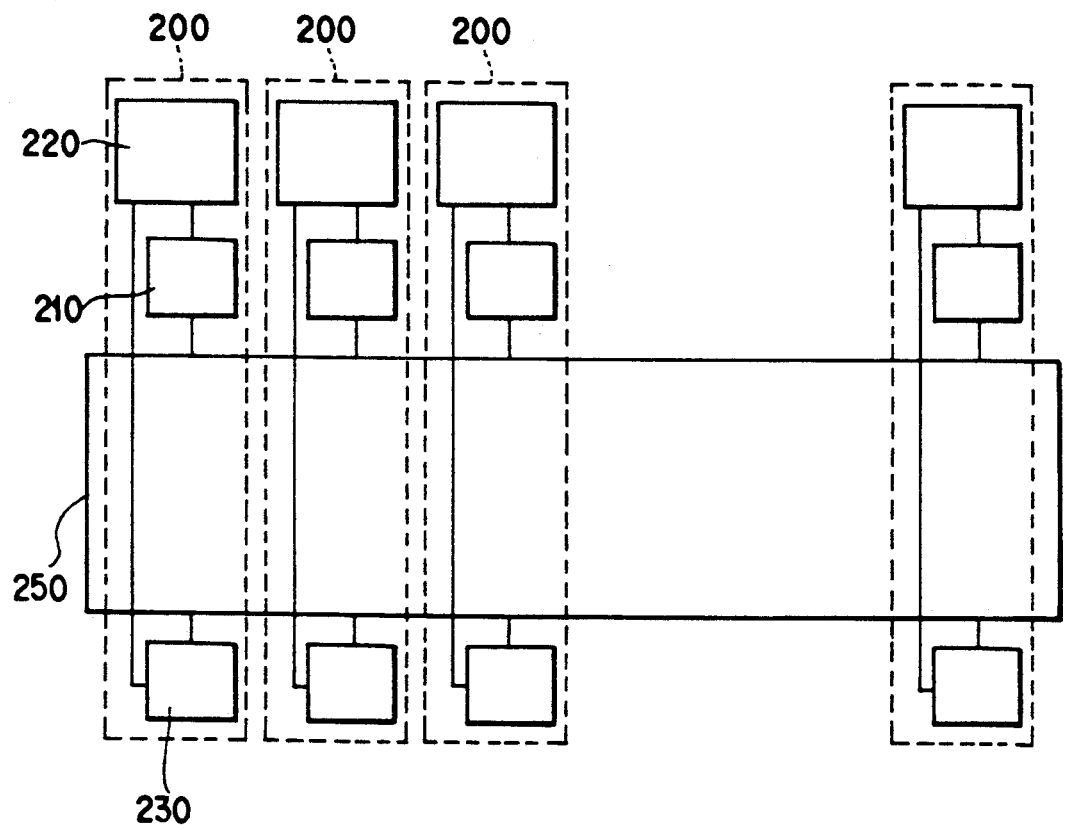
FIG. 7 is a diagram showing the second embodiment of a distribution generation system of the present invention.

FIG. 7 is a diagram showing the second embodiment of a distribution generation system. This system is constituted by N spins 200 each including a condition transition means 220, a memory means 230, and a condition storage means 210. N memory means 230 and N condition storage means 210 in the spins 200 are connected through a circulating N-channel transfer apparatus 250.

In this system, a series of operations to be described below are repetitively executed as one cycle.

The condition storage means 210 transfers a stored condition through the transfer means (or apparatus) 250. In this case, the channels are circulated in the transfer means 250 for each transfer operation, thereby switching a transfer destination of the condition. More specifically, the condition storage means 210 of a spin j transfers a condition to the memory means 230 of a spin j=j mod N in the first transfer operation, and transfers a condition to the memory means 230 of a spin (j+1) mod N in the second transfer operation. In this case, since the transfer means 250 has the N channels, the transfer operations of the condition storage means 210 can be simultaneously executed. After the condition transfer operation is repeated N times, the condition transition means 220 of each spin 200 determines a condition transition on the basis of the above-mentioned GKK rule, and updates the condition of the spin 200. The flow of the operations of the condition transition means 220 is the same as that in the first embodiment. After all the spins 200 complete the condition transitions, the next cycle is started.

FIG. 8 is a diagram showing the third embodiment of a distribution generation system. This system is constituted by N spins 200 each including a condition storage means 210, a condition transition means 220, and a memory means 230. The spins 200 are connected in a ring shape.

In this system, a series of operations to be described below are repetitively executed as one cycle. Since all the spins simultaneously perform the same operation, only the operation of a spin j will be described below.

The spin j transfers a spin value to the memory means 230 of an adjacent processor (j+1) mod N. The memory means 230 of the spin j stacks values transferred from the spin j in a stack in the arrival order. This stack will be referred to as a value stack hereinafter.

The spin j transfers the start value in the value stack to the memory means 230 of the processor (j+1) mod N. In this transfer operation, the start value of the value stack of the spin j is not removed. The abovementioned transfer operation is repeated N-2 times, so that all the spin values except for the value of the spin j are stacked in the value stack of the spin j. Thereafter, the condition transition means 220 of the spin j determines a condition transition on the basis of the above-mentioned GKK rule, and updates the condition of the spin 200. The flow of the operations of the condition transition means 220 is the same as that in the first embodiment.

Taking this situation in account, h may be chosen, for example, as follows:

$$h(r) \propto \begin{cases} e^p r^{1-n} & (0 \leq r \leq e^{-p}) \\ r^{-n} & (e^{-p} > r \leq \sqrt{n}/2) \end{cases},$$

where p is a positive large number. Sampling according to such h will be called $r^{-n}$-sampling (n is the dimension of the torus) in the rest of the paper. Approximated $r^{-n}$-sampling is available by the following procedure:

Let v be a random vector uniformly distributed on the sphere with radius $\sqrt{n}/2$, and let u be a uniform 0−1. Take $x + e^{-au}v$ as a sample point.

This $r^{-n}$-sampling is one example of $r^{-n}$-sampling on a torus. $\sqrt{2n}$ is given by consideration of $r^{-n}$-sampling on n dimensional tours.

For example, let $a = 1 + 17 \log 10$. Quantumize with unit $10^{-17}$ the distribution density $\sigma$ on [0,1] generated by $e^{-au}$, taking the precision of floating point arithmetic into account. Then it may be considered that $$\sigma(r) \propto \begin{cases} 10^{17} & (0 \leq r \leq 10^{-17}) \\ r^{-1} & (10^{-17} < r \leq 1) \end{cases}.$$

Thus, the above producer yields an $r^{-n}$-density for $p = 17 \log 10$.

In the distribution generation system of this embodiment, a probability distribution generated upon repetition of probabilistic transitions using concentrated sampling (i.e., when a given point x is determined, values near the point x are sampled densely, and values at positions far from the point x are sampled sparsely) is very effectively applied to an optimization system to be described below.

Figure 9:
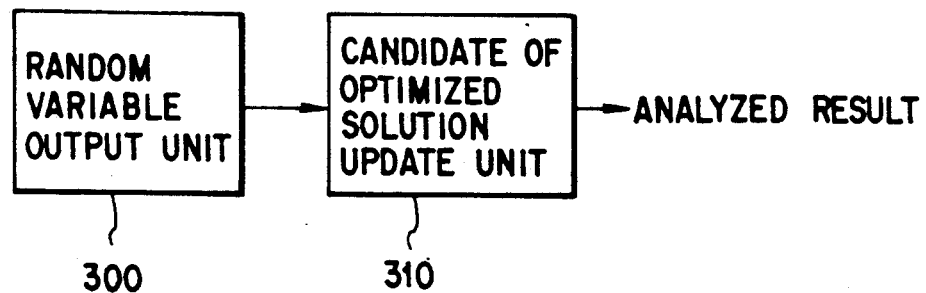
FIG. 9 is a diagram showing a basic arrangement according to the first embodiment of an optimization system of the present invention.

FIG. 9 shows a basic arrangement of an optimization system to which the above-mentioned distribution generation system is applied.

This system comprises a random variable output unit 300, and a candidate of optimized solution update unit 310. The random variable output unit 300 corresponds to the above-mentioned distribution generation system, and time-serially outputs random variables having a predetermined distribution. The random variables output from the random variable output unit 300 are supplied to the candidate of optimized solution update unit 310. The candidate of optimized solution update unit 310 searches an optimized solution while updating a candidate of the optimized solution held in advance based on the random variables output from the random variable output unit 300, thereby obtaining an optimized solution.

Figure 10:
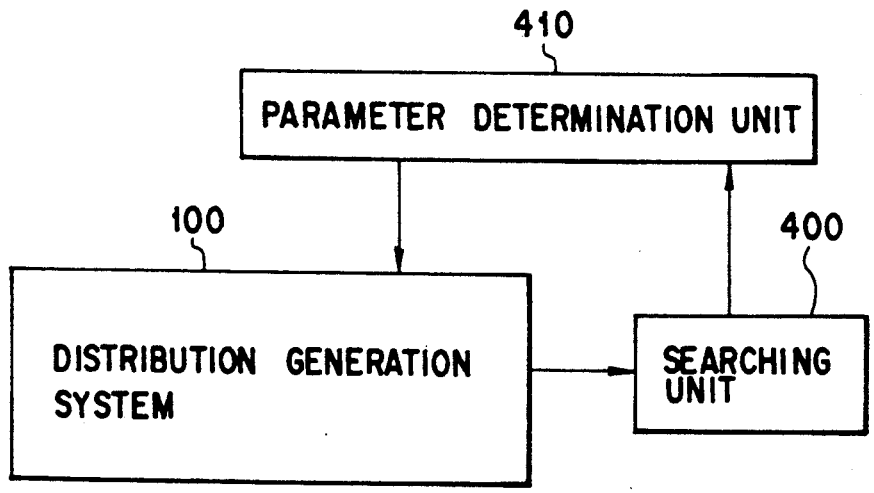
FIG. 10 is a diagram showing a detailed arrangement of the first embodiment of the optimization system of the present invention.

FIG. 10 shows the detailed arrangement of the optimization system on the basis of the basic arrangement shown in FIG. 9.

The system of this embodiment comprises a distribution generation system 100, a searching unit 400, and a parameter determination unit 410. The distribution generation system 100 corresponds to the random variable output unit 300 described above, and the searching unit 400 corresponds to the candidate of optimized solution update unit 310 described above. As will be described in detail later, the parameter determination unit 410 can properly set a parameter $\beta$ of the GKK method for the distribution generation system 100.

In this embodiment, a case will be described below wherein the above-mentioned problem is solved. The distribution generation system 100 generates the above-mentioned random variables $\chi$. More specifically, if a probability that an output value from the distribution generation system 100 is x is represented by P(x), P(x) can be given by:

$$P(x) = 1/Z_\beta \cdot \exp(-\beta V(\xi))$$

where $$Z_\beta = \sum_{j=0}^{2N-1} \exp(-\beta f(x_j))$$

The searching unit 400 holds a point $x_i$ on a period [0,1] as a candidate of an optimized solution.

FIG. 11 shows the flow of the operations of the searching unit 400 shown in FIG. 10. A condition x appearing in the distribution generation system 100 is observed (step B1), and values of f(x) and f(xl) are compared with each other (step B2). If it is determined in step B2 that $f(x) < f(x_1)$, $x_1 = x$ is set to update the value of $x_1$ (step B3).

In the processing shown in FIG. 11, when the parameter $\beta$ of the GKK method in the distribution generation system 100 is appropriately determined, generation of a more desirable probability distribution can be expected. Furthermore, minimum value searching efficiency can be improved by appropriately modifying potential functions on the spins of the distribution generation system 100. As has already been described above, an optimization problem can be converted into an equivalent problem of optimizing potential functions V on the spins. The target function on each spin need not always coincide with V. For example, G may be defined as a function from a real number to another real number as follows:

$$G(y) = \begin{cases} c & \text{if } y > c \\ y & \text{if } y \leq c \end{cases}$$

where c is a constant larger than the minimum value of V. Thus, when GoV is used as a potential function on each spin, a probability distribution generated by the distribution generation system 100 has a peak at the minimum value of V.

Figure 12:
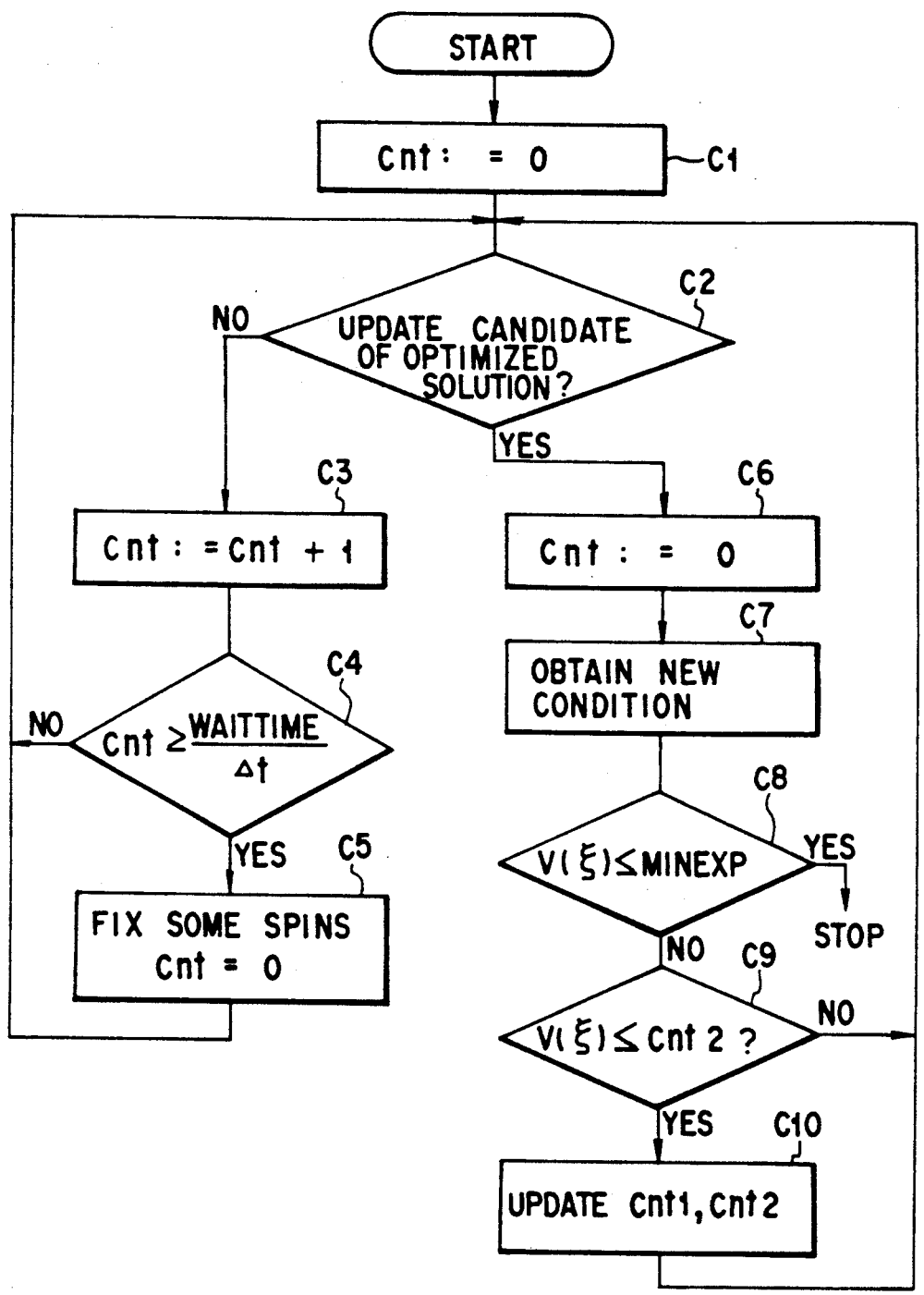
FIG. 12 is a flow chart for explaining the optimization system of the present invention shown in FIG. 10.

The parameter determination unit 410 determines the value $\beta$, modifies the potential functions on the spins, and so on. FIG. 12 shows operations of the parameter determination unit 410 shown in FIG. 10. Assume that constant range, cutnum1, cutnum2, and waittime, and setup minexp of the minimum value are given in advance to the parameter determination unit 410 (for $1 < \text{cutnum1}, 0 < \text{cutnum2} < 1$). In this case, the parameter determination unit 410 determines the parameter $\beta$, cut1, and cut2 (cut1>cut2) in the distribution generation system 100. Note that V is a constant on $\Xi$ to be optimized, and H is a function from a real number to another real number, and is defined by:

$$H(y) = \begin{cases} \text{cut1} & \text{if } y > \text{cut1} \\ y & \text{if cut2} \leq y \leq \text{cut1} \\ \text{minexp} & \text{if } y < \text{cut2} \end{cases}$$

First, cut=0 is set (step C1). It is inquired to the searching unit 400 if the candidate of the optimized solution is updated (step C2). If NO in step C2, cut is incremented by 1 (step C3), and the value cut is compared with the waittime/$\Delta$t (step C4). If it is determined in step C4 that cut r waittime/$\Delta$t, some spin values in the distribution generation system 100 are fixed, so that the corresponding spins are not involved in transitions (step C5). If it is determined in step C4 that cut<waittime/$\Delta$t, the flow returns to step C2.

If it is determined in step C2 that the candidate of the optimized solution is updated, cut=0 is set to clear a counter (step C6). A candidate x1 of the optimized solution is received from the searching unit 400 (step C7), and V($\xi$) and minexp are compared with each other (step C8). If it is determined in step C8 that V($\xi$) s minexp, it is determined that a value smaller than an estimated value of the minimum value is found, and the system is stopped. Otherwise, V($\xi$) and cut2 are compared with each other (step C9), and if V($\xi$)>cut2, the flow returns to step C2. Otherwise, cut1 and cut2 are updated as follows (step C10):

$$\text{cut 1} = \text{cutnum1} \times (V(\xi) - \text{minexp}) + \text{minexp}$$

$$\text{cut2} = \text{cutnum2} \times (V(\xi) - \text{minezp}) + \text{minexp}$$

Thereafter, the flow returns to step C2.

As described above, the searching unit 400 sequentially observes the outputs from the distribution generation system 100, and updates the candidate of the optimized solution. During the update operation, the parameter determination unit 410 appropriately determines the parameters of the distribution generation system 100. With this processing, an optimized solution can be efficiently searched.

FIG. 13 shows the schematic arrangement according to the second embodiment of an optimization system of the present invention.

An optimization system 500 comprises a parameter value storage unit 510, a physical quantity storage unit 520, a parameter value sampling unit 530, a parameter value output unit 540, a physical quantity input unit 550, and a parameter value update unit 560. The parameter value storage unit 510 stores a parameter value. The physical quantity storage unit 520 stores a physical quantity corresponding to the value stored in the parameter value storage unit 510. The parameter value sampling unit 530 densely samples values near the parameter value stored in the parameter value storage unit 510, and sparsely samples values far from the parameter value. The parameter value output unit 540 outputs the parameter value to an external device 600. The physical quantity input unit 550 receives, from the external device 600, a physical quantity determined depending on the parameter value output from the parameter value output unit 540. The parameter value update unit 560 updates the parameter value stored in the parameter value storage unit 510 on the basis of the physical quantity input to the physical quantity input unit 550.

The optimization system 500 with the abovementioned arrangement sequentially updates the parameter values in the following operation sequence, thereby searching the minimum value of a physical quantity.

When the initial value of a parameter is stored in the parameter value storage unit 510, the parameter initial value is sent from the parameter value storage unit 510 to the parameter value output unit 540. The parameter value output unit 540 outputs the received parameter initial value to the external device 600. The physical quantity input unit 550 receives, from the external device 600, a physical quantity corresponding to the parameter initial value, and sends it to the physical value storage unit 520. The physical value storage unit 520 stores the physical quantity corresponding to the parameter initial value.

A parameter value stored in the parameter value storage unit 510 is represented by x. The parameter value sampling unit 530 generates a plurality of sample parameter values. The sample parameter values are distributed very densely near the parameter value x, and are distributed sparsely as they are separated from the parameter value x.

The parameter value output unit 540 outputs the sample parameter values generated by the parameter value sampling unit 530 to the external device 600. The physical quantity input unit 550 receives, from the external device 600, physical quantities corresponding to the sample parameter values.

In this state, the parameter value update unit 560 compares a minimum physical quantity P of those corresponding to the sample parameter values with a physical quantity $P_0$ stored in the physical quantity storage unit 520. If P is smaller than $P_0$, the parameter value update unit 560 replaces the parameter value stored in the parameter value storage unit 510 with one of the sample parameter values, which gives P. At the same time, the parameter value update unit 560 replaces the physical quantity $P_0$ stored in the physical quantity storage unit 520 with P. If P is not smaller than $P_0$, the parameter value update unit 560 outputs the parameter value stored in the parameter value storage unit 510, and the physical quantity stored in the physical quantity storage unit 520.

In this embodiment, the parameter value sampling unit 530 densely samples values near the parameter value x, and sparsely samples values far from the parameter value x. Therefore, since the parameter value sampling unit 530 also samples far points, global physical quantity searching can be performed. Since close points are sampled very densely by the parameter value sampling unit 530, a parameter value optimal for the physical quantity can be obtained with high precision. Furthermore, since the apparatus of this embodiment performs an operation based on sampling, searching efficiency can also be improved.

As the first example of the second embodiment, a case will be explained below wherein a point having the largest altitude is found out from pieces of altitude information stored in a map information database.

Altitudes are expressed in the form of a 16,384×16,384 matrix, and are represented by $h_{ij}$. The suffixes i and j of the matrix range between 0 and $16,383 = 2^{14} - 1$. A case will be examined below wherein a parameter value for maximizing an altitude using a coordinate position expressed by a set (i,j) of suffixes as a parameter.

FIG. 14 shows the schematic arrangement of the first example of the second embodiment. The optimization system 500 comprises the parameter value storage unit 510, the physical quantity storage unit 520, the parameter value sampling unit 530, the parameter value output unit 540, the physical quantity input unit 550, and the parameter value update unit 550.

The optimization system 500 with the above arrangement is connected to a data matching unit 630 as an external device. The data matching unit 630 sends back an element of the matrix having parameter values sent from the parameter value output unit 540 of the optimization system 500 as suffixes, i.e., an altitude at the position indicated by the parameter values, to the physical quantity input unit 550 as a physical quantity. An initial value determination unit 610 randomly determines initial parameter values using random numbers, and a Control unit 620 outputs a result.

The parameter value sampling unit 530 performs its operation as follows.

Assume that binary expressions of integers k equal to or larger than 0 and equal to or smaller than $2^{14}-1$ are represented by $\xi_{13}(k), \xi_{12}(k), \ldots, \xi_c(k)$. That is, we have:

$$k = \sum_{I=0}^{13} 2^I \epsilon_1(k)$$

For integers $\mu$ equal to or larger than 0 and equal to or smaller than 13, integers equal to or larger than 0 and equal to or smaller than $2^{14}-1$ are determined as follows:

$$\tau_{uk} = \sum_{1 \neq \mu} 2^l \xi_1(k) + 2^\mu(1 - \xi_\mu(k))$$

From the above equation, when k is expressed by a binary value, $\tau_\mu k$ becomes a numeral obtained by being replaced with 1 when a numeral at the $2^\mu$'s position is 0, or being replaced with 0 if it is 1.

The parameter value sampling unit 530 generates the following 28 sample parameter values for a parameter (I,J) stored in the parameter value storage unit 510.

$$(\tau_\mu I,J), (I,\tau_\nu J) \quad (0 \leq \mu, \nu \leq 13)$$

Therefore, the above-mentioned sample parameters are distributed densely near (I,J), and are distributed sparsely at positions far from (I,J).

When the number n of data to be received from the optimization system 500 is set in advance in the control unit 620, this apparatus operates as follows.

When the number of data actually received by the control unit 620 is smaller than n, the initial value determination unit 610 determines a parameter initial value, and the initial value is stored in the parameter value storage unit 510. The parameter initial value is sent to the parameter value output unit 540. The parameter value output unit 540 outputs the initial value to the data matching unit 630. In this state, the physical quantity input unit 550 receives an altitude corresponding to the parameter initial value from the data matching unit 630, and sends the received altitude to the physical quantity storage unit 520. The physical quantity storage unit 520 stores the received altitude.

If the parameter value stored in the parameter value storage unit 510 is (I,J), the parameter value sampling unit 530 generates 28 sample parameter values for the parameter value (I,J), as described above. The parameter value output unit 540 outputs the sample parameter values generated by the parameter value sampling unit 530 to the data matching unit 630. When the physical quantity input unit 550 receives altitudes corresponding to the sample parameter values from the data matching unit 630, the parameter value update unit 560 compare a maximum altitude H of those corresponding to the sample parameter values, and an altitude $H_0$ stored in the physical quantity storage unit 520. If H is smaller than $H_0$, the parameter value update unit 560 replaces the parameter value stored in the parameter value storage unit 510 with one of the sample parameter values, which gives H. At the same time, the parameter value update unit 560 replaces the altitude $H_0$ stored in the physical quantity storage unit 520 with H. If H is not smaller than $H_0$, the parameter value update unit 560 supplies the parameter value stored in the parameter value storage unit 510 and the altitude stored in the physical quantity storage unit 520 to the control unit 620. When the control unit 620 actually receives n data from the parameter value update unit 560, it outputs a maximum altitude of the data, and the parameter value giving the corresponding altitude.

As the second example of the second embodiment, a case will be explained below wherein construction cost of a core, which can satisfy a critical condition in the problem of optimal design of the core of a nuclear reactor, is to be minimized.

Parameters r, h, and u, which can minimize core construction cost given by:

$$c = a_1 r^2 hu + a_2 \sqrt{u} - a_3 r \sqrt{h}$$

under the critical condition:

$$\frac{1}{ku}\left(\frac{a^2}{r^2} + \frac{\pi^2}{h^2}\right) \leq 1$$

must be obtained. The core has a cylindrical shape, the radius of the core is represented by r, the height of the core is represented by h, and the degree of enrichment of a fission material is represented by u. Note that $a$, $k$, $a_1$, $a_2$, and $a_3$ are constants. Parameters (r, h, u) for minimizing cost c within ranges of $0 \leq r \leq R$, $0 \leq h \leq H$, and $0 \leq u \leq U$ (where R, H, and U are constants) are searched (R, H, U $\geq$ 1). Alternatively, parameters (x, y, z), which satisfy the following critical condition within a range of $0 \geq x, y, z \geq 1$:

$$\frac{1}{KUz}\left(\frac{a^2}{(Rx)^2} + \frac{\pi^2}{(Hy)^2}\right) \leq 1 \quad (1)$$

and, which minimize cost C, are found out. In this case, C is given by:

$$c = a_1(Rx)^2(Hy)(Uz) + a_2\sqrt{Uz} - a_3(Rx)\sqrt{Hy}$$

FIG. 15 shows the schematic arrangement of the second example of the second embodiment. The optimization system 500 comprises the parameter value storage unit 510, the physical quantity storage unit 520, the parameter value sampling unit 530, the parameter value output unit 540, the physical quantity input unit 550, and the parameter value update unit 560.

The optimization system 500 is connected to a cost calculation device 640 as an external device. The cost calculation device 640 calculates cost C necessary for constructing a core having parameter values sent from the parameter value output unit 540 of the optimization system 500, and sends it back to the physical quantity input unit 550 of the optimization system 500. The initial value determination unit 610 and the control unit 620 are the same as those in the first example.

The operation of the cost calculation device 640 is as follows.

If the received parameter values (x, y, z) satisfy relation (1) described above, the device 640 calculates the value C according to formula (2). The device 640 outputs the value C to the physical quantity input unit 550 of the optimization system 500. If the parameter values (x, y, z) do not satisfy relation (1), the device 640 sends a value calculated according to the following formula to the physical quantity input unit 550.

$$\sqrt{(x-1/R)^2+(y-1/H)^2+(z-1/U)^2}+B \quad (2)$$

where B is a sufficiently large positive real number.

Formula (3) serves to impose penalties on the parameter values (x, y, z), which do not satisfy relation (1).

The parameter value sampling unit 530 generates the following 96 sample parameter values for the parameter values (x, y, z) stored in the parameter value storage unit 510:

$$(\overline{x+(-2)^{-\alpha}}, y, z), (x, \overline{y+(-2)^{-\beta}}, z),$$
$$(x, y, \overline{z+(-2)^{-\gamma}}) \ (1 \leq \alpha, \beta, \gamma \leq 32)$$

When x is a negative value, $\overline{x}$ represents $x+1$, and when x is larger than 1, it represents $x-1$.

When the number n of data to be received from the optimization system 500 is set in advance in the control unit 620, this apparatus operates as follows.

When the number of data actually received by the control unit 620 is smaller than n, the initial value determination unit 610 determines parameter initial values, and the initial values are stored in the parameter value storage unit 510. The parameter initial values are sent to the parameter value output unit 540. The parameter value output unit 540 outputs the initial values to the cost calculation device 640. The physical quantity input unit 550 receives core construction cost corresponding to the parameter initial values from the cost calculation device 640, and sends the received construction cost to the physical quantity storage unit 520. The physical quantity storage unit 520 stores the construction cost.

If the parameter values stored in the parameter value storage unit 510 are (X, Y, Z), the parameter value sampling unit 530 generates 96 sample parameter values for the parameter values (X, Y, Z), as described above. The parameter value output unit 540 outputs the sample parameter values generated by the parameter value sampling unit 530 to the cost calculation device 640. When the physical quantity input unit 550 receives cost values corresponding to the sample parameter values from the cost calculation device 640, the parameter value update unit 560 compares minimum cost E of those corresponding to the sample parameter values, and cost $E_0$ stored in the physical quantity storage unit 520. If E is smaller than $E_0$, the parameter value update unit 560 replaces the parameter values stored in the parameter value storage unit 510 with one of the sample parameter values, which gives E. At the same time, the parameter value update unit 560 replaces the cost $E_0$ stored in the physical quantity storage unit 520 with E. If E is not smaller than $E_0$, the parameter value update unit 560 supplies the parameter values stored in the parameter value storage unit 510 and the cost stored in the physical quantity storage unit 520 to the control unit 620. When the control unit 620 actually receives n data from the parameter value update unit 560, it outputs maximum cost of the data, and the parameter values giving the minimum core construction cost.

The present invention is not limited to the above embodiments, and various changes and modifications may be made within the spirit and scope of the invention.

Additional advantages and modifications will readily occur to those skilled in the art. Therefore, the invention in its broader aspects is not limited to the specific details, and representative devices, shown and described herein. Accordingly, various modifications may be made without departing from the spirit or scope of the general inventive concept as defined by the appended claims and their equivalents.

What is claimed is:

1. A distribution generation system comprising: a plurality of units each of which includes condition storage means for storing a corollary condition, and condition transition means for updating the condition of said condition storage means, wherein in each of said plurality of units, said condition transition means causes a plurality of stochastic processes per unit time for causing the condition of said condition storage means to transit to a predetermined condition to approximately continuous, so that the corollary condition is converged to random variables having a predetermined distribution.

2. A system according to claim 1, wherein said condition transition means includes means for forming a distribution which is dense near a point indicating the condition stored in said condition storage means, and is sparse at positions far from the point.

3. A system according to claim 2, wherein said condition transition means includes means for converging the distribution of the random variables to a desired distribution by repeating probabilistic transitions according to the corollary condition.

4. A system according to claim 2, wherein said condition transition means includes means for generating $\gamma^{-n}$-sampling.

5. A system according to claim 1, wherein each of said plurality of units includes memory means for holding the corollary condition from other units.

6. A system according to claim 5, further comprising:
a transfer device for connecting said condition storage means and said memory means of said plurality of units.

7. A system according to claim 1, wherein said plurality of units constitute a P-adic tree (where P is an integer not less than 2).

8. A system according to claim 1, wherein said plurality of units are coupled in a ring shape.

9. An optimization system comprising:
random variable output means for time-serially outputting random variable values having a predetermined distribution; and candidate of optimized solution update means for holding a candidate of an optimized solution, said candidate of optimized solution update means including means for performing optimized solution searching while updating the candidate of the optimized solution on the basis of the random variable values output from said random variable output means.

10. A system according to claim 9, wherein said random variable output means includes means for outputting a distribution in which the random variables are distributed densely near a center of the distribution, and are distributed sparsely in a direction to be separated from the center.

11. An optimization system comprising:

distribution generation means for time-serially outputting random variable values having a predetermined distribution;

parameter determination means for properly determining various parameters to be supplied to said distribution generation means; and searching means for holding a candidate of an optimized solution, said searching means including means for performing optimized solution searching while updating the candidate of the optimized solution on the basis of the random variable values output from said distribution generation means.

12. A system according to claim 11, wherein said distribution generation means includes means for outputting a concentrated sampling distribution in which the random variables are distributed densely near a center of the distribution, and are distributed sparsely in a direction to be separated from the center.

13. A system according to claim 12, wherein said distribution generation means includes means for repeating probabilistic transitions using the concentrated sampling distribution.

14. An optimization system comprising:

parameter value storage means for storing a parameter value;

physical quantity storage means for storing a physical quantity corresponding to the parameter value stored in said parameter value storage means;

parameter value sampling means for executing concentrated sampling for densely sampling values near the parameter value stored in said parameter value storage means, and sparsely sampling values far from the parameter value, and for outputting sample parameter values;

physical quantity fetching means for outputting the sample parameter values generated by said parameter value sampling means to an external device, and fetching physical quantities corresponding to the sample parameter values from said external device; and parameter value update means for updating the parameter value stored in said parameter value storage means according to a comparison result between the physical quantities corresponding to the sample parameter values fetched by said physical quantity fetching means, and the parameter value stored in said parameter value storage means.

15. A system according to claim 14, wherein said parameter value sampling means includes means for repeating probabilistic transitions using the concentrated sampling.

* * * * *

UNITED STATES PATENT AND TRADEMARK OFFICE
CERTIFICATE OF CORRECTION

PATENT NO.   :   5,285,395
DATED        :   February 8, 1994
INVENTOR(S)  :   Toru KAMBAYASHI It is certified that error appears in the above-indentified patent and that said Letters Patent is hereby corrected as shown below:

On the title page, Item [19] and Item [75], the inventor's last name should read as follows:

--Kambayashi--

Signed and Sealed this

Fourteenth Day of June, 1994

Attest:

BRUCE LEHMAN

Attesting Officer    Commissioner of Patents and Trademarks